(12) United States Patent
Herrema, III

(10) Patent No.: US 11,349,850 B2
(45) Date of Patent: May 31, 2022

(54) SYSTEMS AND METHODS FOR MANAGING MOBILE DEVICES BASED ON DEVICE LOCATION DATA

(71) Applicant: BlackBerry Limited, Waterloo (CA)

(72) Inventor: John Raymond Herrema, III, Palo Alto, CA (US)

(73) Assignee: BlackBerry Limited, Waterloo (CA)

( * ) Notice: Subject to any disclaimer, the term of this patent is extended or adjusted under 35 U.S.C. 154(b) by 12 days.

(21) Appl. No.: 16/701,365

(22) Filed: Dec. 3, 2019

(65) Prior Publication Data
US 2021/0168152 A1  Jun. 3, 2021

(51) Int. Cl.
H04L 29/06 (2006.01)
H04W 4/029 (2018.01)
G06F 16/29 (2019.01)

(52) U.S. Cl.
CPC ............ *H04L 63/107* (2013.01); *G06F 16/29* (2019.01); *H04L 63/1425* (2013.01); *H04W 4/029* (2018.02)

(58) Field of Classification Search
CPC .. H04L 63/107; H04L 63/1425; H04W 4/029; G06F 16/29
See application file for complete search history.

(56) References Cited

U.S. PATENT DOCUMENTS

| | | | | |
|---|---|---|---|---|
| 8,238,922 | B2* | 8/2012 | Parameswar | H04L 67/18 455/445 |
| 10,694,321 | B1* | 6/2020 | Burcham | G06Q 30/0202 |
| 2013/0097246 | A1* | 4/2013 | Zifroni | H04W 4/029 709/204 |
| 2018/0113881 | A1* | 4/2018 | Kecskemeti | G06F 16/29 |
| 2020/0221366 | A1* | 7/2020 | Palmer | G01S 5/0284 |
| 2020/0294074 | A1 | 9/2020 | Yang et al. | |

FOREIGN PATENT DOCUMENTS

WO   WO2019137230   7/2019

OTHER PUBLICATIONS

Extended Euroepan Search Report , EP Application No. 20208598. 1, dated Apr. 21, 2021.
Liu Rong et al: "An Unsupervised Collaborative Approach to Identifying Home and Work Locations", 2016 17th IEEE International Conference on Mobile Data Management (MOM). IEEE. Jun. 13, 2016.

* cited by examiner

*Primary Examiner* — Abu S Sholeman
(74) *Attorney, Agent, or Firm* — Rowand LLP

(57) ABSTRACT

A processor-implemented method is disclosed. The method includes: obtaining a plurality of location data points associated with the user device, each location data point including geographic coordinates; storing, in a database, the plurality of location data points; obtaining a first set of geohashes corresponding to the plurality of location data points, each location data point mapping to one of the geohashes of the first set; determining, for each geohash in the first set, a representative geographic location based on stored geographic coordinates of location data points which map to the geohash; identifying a plurality of location clusters based on performing clustering using the geohashes of the first set; and determining normalized cluster locations associated with the plurality of location clusters based on the representative geographic locations associated with the geohashes of the first set.

20 Claims, 9 Drawing Sheets

SYSTEMS AND METHODS FOR MANAGING MOBILE DEVICES BASED ON DEVICE LOCATION DATA

TECHNICAL FIELD

The present disclosure relates to mobile device management and, in particular, to systems and methods for managing mobile devices based on analysis of device usage patterns.

BACKGROUND

Enterprises administer mobile device management (MDM) systems for managing devices of users that are part of the enterprise's network. An MDM system monitors, manages and secures deployed devices. The role of MDM is to increase device supportability, security, and corporate functionality. An administrator for an enterprise may distribute applications, data, and configuration settings over-the-air and enforce various security policies using an MDM system.

The security settings of an MDM system may be informed by device usage patterns of individual users. By recognizing user behavior patterns, the MDM system can evaluate the risk of the user's behavior based on how well it matches past patterns for both the specific user and other users in the same organization. The MDM system may monitor and track user devices in attempting to identify patterns. This may, in turn, allow the MDM system to dynamically adapt security policies for different user devices based on the monitoring. For example, an MDM system may adapt permissive security policies when behavior is perceived as normal in view of usage patterns, and more restrictive policies when behavior is perceived as anomalous and high-risk.

It is desirable to identify usage patterns for user devices which may inform a dynamic adjustment of security policies for the user devices by an MDM system.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
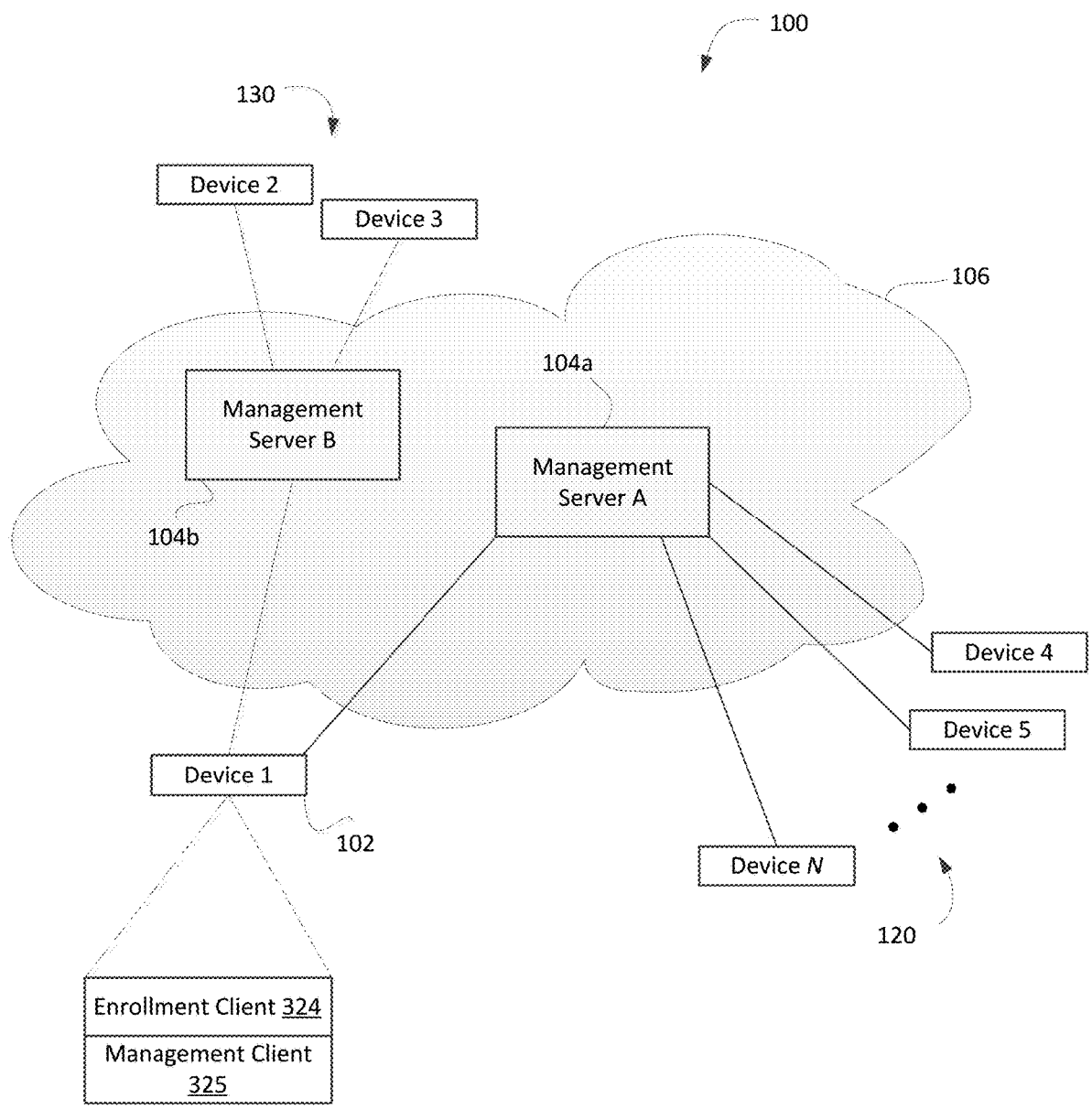
FIG. 1 is a schematic diagram illustrating an exemplary operating environment for managing one or more Internet-connected devices.

In an aspect, the present disclosure describes a processor-implemented method for controlling device usage permissions for a user device. The method includes: obtaining a plurality of location data points associated with the user device, each location data point including geographic coordinates; storing, in a database, the plurality of location data points; obtaining a first set of geohashes corresponding to the plurality of location data points, each location data point mapping to one of the geohashes of the first set; determining, for each geohash in the first set, a representative geographic location based on stored geographic coordinates of location data points which map to the geohash; identifying a plurality of location clusters based on performing clustering using the geohashes of the first set; and determining normalized cluster locations associated with the plurality of location clusters based on the representative geographic locations associated with the geohashes of the first set.

In some implementations, the geographic coordinates may comprise latitude and longitude coordinates associated with the user device.

In some implementations, determining the representative geographic location for a geohash may comprise computing a centroid representing an arithmetic mean of the geographic coordinates of location data points which map to the geohash.

In some implementations, the method may further include computing at least one of variance or standard deviation for latitude and longitude coordinates of the location data points which map to the geohash.

In some implementations, the method may further include: determining relative device location for the user device, the relative device location indicating a current location of the user device relative to one or more of the normalized cluster locations; and selecting a security policy for the user device based on the relative device location.

In some implementations, selecting the security policy may comprise selecting a first security mode in response to determining that the current location of the user device is within a predefined threshold distance from a normalized cluster location associated with at least one of the plurality of location clusters.

In some implementations, the method may further comprise determining, for each of the plurality of location clusters, a frequency value representing a number of the location data points associated with the location cluster, wherein selecting the security policy comprises selecting a security mode for the user device based on a determination of whether a frequency value of the at least one location cluster exceeds a predefined threshold number.

In some implementations, selecting the security policy may comprise selecting a second security mode in response to determining that the current location of the user device is not within a predefined threshold distance from any of the normalized cluster locations.

In some implementations, obtaining the first set of geohashes may comprise converting, for each of the plurality of location data points, geographic coordinates associated with the location data point to a geohash.

In some implementations, storing the plurality of location data points in the database may comprise storing, for each of the location data points, geographic coordinates of the location data point in association with a geohash of the first set to which the location data point maps.

In another aspect, the present disclosure describes a computing system including a memory and a processor coupled to the memory. The processor is configured to: obtain a plurality of location data points associated with the user device, each location data point including geographic coordinates; store, in a database, the plurality of location data points; obtain a first set of geohashes corresponding to the plurality of location data points, each location data point mapping to one of the geohashes of the first set; determine, for each geohash in the first set, a representative geographic location based on stored geographic coordinates of location data points which map to the geohash; identify a plurality of location clusters based on performing clustering using the geohashes of the first set; and determine normalized cluster locations associated with the plurality of location clusters based on the representative geographic locations associated with the geohashes of the first set.

In yet another aspect, the present disclosure describes a non-transitory processor-readable storage medium comprising instructions which, when executed by a processor, configure the processor to: obtain a plurality of location data points associated with the user device, each location data point including geographic coordinates; store, in a database, the plurality of location data points; obtain a first set of geohashes corresponding to the plurality of location data points, each location data point mapping to one of the geohashes of the first set; determine, for each geohash in the first set, a representative geographic location based on stored geographic coordinates of location data points which map to the geohash; identify a plurality of location clusters based on performing clustering using the geohashes of the first set; and determine normalized cluster locations associated with the plurality of location clusters based on the representative geographic locations associated with the geohashes of the first set.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "location", when used in relation to a user device, refers to a current location of the user device. A device's location may be described in relative terms (e.g. located in a specific office) or as a geographic location, identified using geographic (e.g. latitude, longitude) coordinates. Geographic coordinates, as used in the present application, may refer to two-dimensional coordinates, such as latitude and longitude coordinates, as well as three-dimensional coordinates, such as altitude.

An MDM system may be capable of tracking and monitoring device usage patterns of user devices that are deployed in an organization. Various different parameters of device usage behavior may be tracked. An important parameter is device location and, more specifically, geographic location associated with a user device. Device location patterns may uniquely identify a user. Such patterns may also directly relate to risk of losing a device or data compromise. For example, if a user is accessing their device in a "trusted" location (e.g. home, office, etc.), their risk of losing the device or exposure to unauthorized access of device data by an attacker would be lower than if the user were in an untrusted location. Accordingly, when attempting to learn a user's device usage behavior patterns, it is desirable to incorporate location in the model because of its unique relationship to both the user's identity and risk of device loss and/or unauthorized access.

By modelling a user's device usage patterns, an MDM system may also be able to determine the device's compliance with various policies or regulations. For example, in some cases, when a user leaves a country of origin, different compliance requirements may apply to the user's device, either based on internal corporate policy or explicit industry regulations. Incorporating a user's device location data into the model of usage behavior can thus enable an MDM system to monitor compliance states associated with the user's device.

A common approach to learning patterns is to apply data clustering techniques, where data points are collected from user devices and/or applications used and subject to clustering analysis to identify frequently occurring usage patterns. A challenge, however, with many clustering techniques is that they either do not scale well or result in a loss of precision because the patterns that emerge from clustering are approximations of actual behavior.

In the mobile security context, and particularly with respect to patterns that include and rely on location, precision retention can be critical. To find patterns based on usage of a device at a home location, a difference of 0.001 degree in latitude or longitude between clustering approximation and the user's actual home location may translate to hundreds of meters of distance. As a possible consequence, a neighbor's home may be treated as a "trusted" location while the user's actual home is not.

One way to solve this is to perform explicit, high-precision distance calculations on each and every data point as clustering algorithm execution proceeds. However, this leads to overly expensive processing performance.

The present disclosure describes a solution for efficient cluster analysis of device usage data. In accordance with example embodiments, user device location data is encoded into geohashes. Specifically, geographic coordinates associated with location data points are encoded to string representations, or geohashes. Comparisons performed during clustering can then treat location as a categorical variable, where matches are based on efficient string comparison and not on explicit distance calculations. Typically, geohash translation may introduce imprecision because all locations within an area represented by a given geohash are treated as having the same location. In particular, all data points of a given geohash may be treated as being located at the center of a box that each geohash covers, not locations where actual usage occurred.

The present solution employs geohashes for performance improvement but with a novel approach to encoding and decoding that allows actual location precision to be retained. Prior to performing cluster analysis, each device usage data point is processed to translate latitude and longitude coordinates into a corresponding geohash. Standard geohash encoding algorithms may be used to perform the encoding step. While the conversion occurs, the actual latitude and longitude coordinates for each data point associated with each geohash are stored in a database, such as a dictionary. At the conclusion of the conversion step, an "adjusted centroid" is computed for each geohash. The adjusted centroid may be a geographic location representing an arithmetic mean of the saved latitude and longitude values. Clustering is then performed using the encoded geohash value as a single categorical variable. Once clusters are formed, a decoding operation is performed to translate the geohash back into an explicit latitude and longitude value. The adjusted centroid is used during this decoding operation such that location of clusters formed reflect the actual location within the geohash's bounding box where usage concentrated, and not an arbitrary center of that bounding box that would otherwise be returned by a standard geohash decoding operation. This allows explicit distance calculations to be performed during subsequent risk assessment operations without a loss of precision and with the ability to map the user's current behavior to actual past behavior.

Reference is made to FIG. 1, which shows an exemplary operating environment 100 in accordance with embodiments of the present disclosure. The environment 100 includes at least a first device 102. The first device 102 is an Internet-connected device. In particular, the first device 102 may be a physical device, vehicle, appliance, or another object that is configured for connecting to the Internet. The first device 102 may, for example, be an electronic device, such as a smartphone, a tablet, a laptop computer, a personal digital assistant, a portable navigation device, a wearable device, or any other type of computing device that may be configured to store data and software instructions. As further examples, the first device 102 may be a connected vehicle, a smart home appliance, a health monitoring device, a medical device, or manufacturing equipment. More generally, the first device 102 may be an IoT device. That is, the first device 102 may be a physical object that has been configured to connect to and exchange data via the Internet. An otherwise non-connected physical object may be modified by embedding the object with electronics, software, sensors, actuators, etc. in order to enable Internet connectivity.

The environment 100 includes a first management server 104a. The first management server 104a is associated with a first device management service. In particular, the first management server 104a may be a control server for the first device management service. The first management server 104a implements one or more device management protocols. For example, the first management server 104a is configured to send commands and other data, such as software updates, compliance policies, etc., to managed devices. In some embodiments, the first management server 104a may also be associated with a second device management service. That is, two or more device management services may be administered at the same management server. Alternatively, the environment 100 may include a further second management server 104b, which is associated with the second device management service. The first management server 104a and the second management server 104b may be independently controlled. For example, the first management server 104a may be controlled by a first entity that is different from and independent of a second entity which manages the second management server 104b.

The first device 102 is in wireless communication with at least the first management server 104a. In the embodiment illustrated in FIG. 1, the first device 102 is also in wireless communication with the second management server 104b. The environment 100 also includes a plurality of second devices 120 that are in wireless communication with the first management server 104a, and a plurality of third devices 130 that are in wireless communication with the second management server 104b. The first management server 104a is configured to administer at least one of the first device 102 and second devices 120, and the second management server 104b is configured to administer at least one of the first device 102 and the third devices 130. The devices 102, 120 and 130 may be IoT devices. In particular, each device in the environment 100 may include a communication subsystem that is configured for data communication with one or more of the management servers 104a and 104b.

The network 106 is a computer network. The network 106 allows computer systems in communication therewith to communicate. For example, as illustrated, the network 106 may allow the first device 102 and the second devices 120 to communicate with the first management server 104a and the first device 102 and the third devices 130 to communicate with the second management server 104b.

The devices in the environment 100 are configured to execute instructions for enrolling with one or more device management services. As shown in FIG. 1, the first device 102 includes an enrollment client 324. The enrollment client 324 may, for example, be a web application (e.g. single-page application, or SPA), a mobile application, or a desktop application. In some embodiments, the enrollment client 324 may be implemented as a component or feature of another application, such as a mobile device management app. The enrollment client 324 may be an app that can be used to enroll and configure the first device 102 to communicate with one or more of the management server 104a and 104b.

The first device 102 also includes a management client 325. The management client 325 may, for example, be a stand-alone web/mobile/desktop application, or it may be implemented as a component or feature of another application. The management client 325 may be used to request synchronization of the first device 102 with a management server. For example, the management client 325 may be configured to check for available updates at a device management server, receive commands or policies set by an administrator of the device management service, and apply the received commands/policies on the first device 102. One or both of the enrollment client 324 and the management client 325 may be implemented as part of software or firmware for the first device 102. For example, the enrollment client 324 and the management client 325 may be installed on the first device 102 at the time of its manufacture, or downloaded from a third-party server for installing on the first device 102.

In some embodiments, the enrollment client 324 and the management client 325 may be components of an agent application that is installed on the first device 102. The agent application may function as the client-side focal point for communications between the first device 102 and the desired management server. For example, the agent application may be configured to examine a state of the first device 102, such as the device's current location, functionalities, security settings, and software version, and report related information to a management server. The agent application can then receive commands and/or device management data (e.g. configuration settings, software updates, device security policies) from the management server, and make may adjustments to the first device's behavior or state to comply with the policies set by the device management service.

Figure 2A:
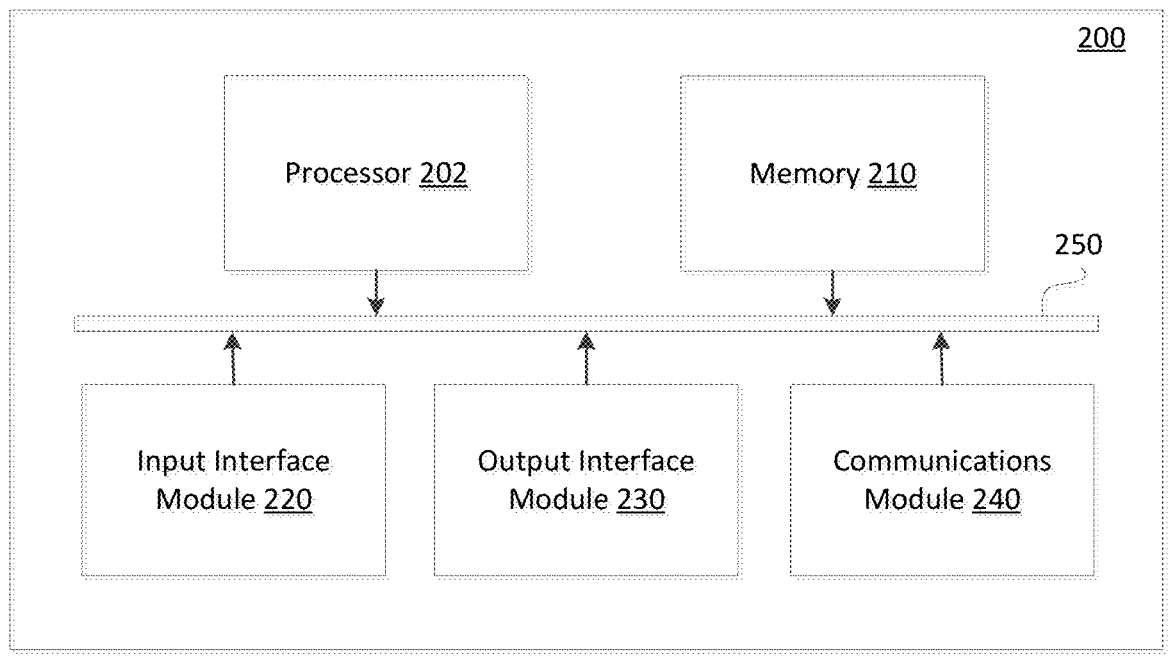
FIG. 2A is a high-level operation diagram of an example computing system for implementing example embodiments of an access control system.

FIG. 2A is a high-level operation diagram of an example computing system 200 that may be configured as a device management control server. The computing system 200 includes a plurality of modules. For example, the computing system 200 may include a processor 202, a memory 210, an input interface module 220, an output interface module 230, and a communications module 240. As illustrated, the foregoing example modules of the computing system 200 are in communication over a bus 250.

The processor 202 is a hardware processor. Processor 202 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the computing system 200.

The input interface module 220 allows the computing system 200 to receive input signals. Input signals may, for example, correspond to input received from a user. The input interface module 220 may serve to interconnect the computing system 200 with one or more input devices. The output interface module 230 allows the computing system 200 to provide output signals. Some output signals may, for example allow provision of output to a user. The output interface module 230 may serve to interconnect the computing system 200 with one or more output devices. Output signals may be sent to output devices by output interface module 230.

The communications module 240 allows the computing system 200 to communicate with other devices and/or various communications networks. For example, the communications module 240 may allow the computing system 200 to send or receive communications signals. Communications signals may be sent or received according to one or more protocols or standards. For example, the communications module 240 may allow the computing system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the computing system 200 to communicate using near-field communication (NFC), via Wi-Fi (TM), using Bluetooth (TM) or via some combination of one or more networks or protocols.

Software comprising instructions is executed by the processor 202 from a computer-readable medium. For example, software may be loaded into random-access memory from persistent storage of memory 210. Additionally, or alternatively, instructions may be executed by the processor 202 directly from read-only memory of memory 210.

Figure 2B:
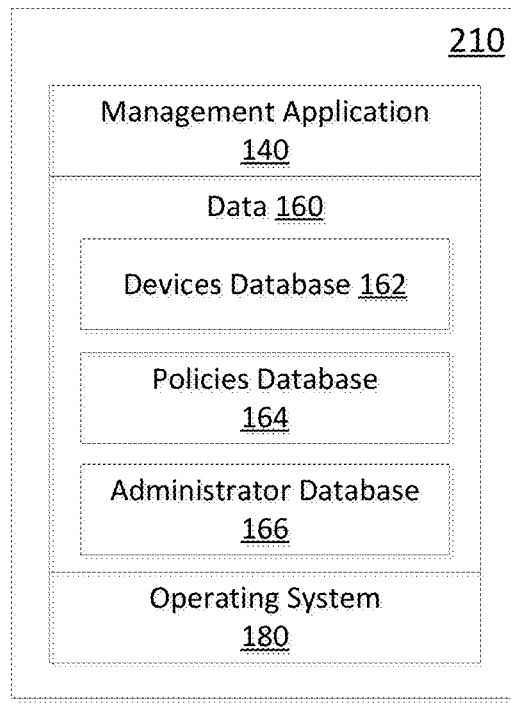
FIG. 2B depicts a simplified software organization of the example computing system of FIG. 2A.

FIG. 2B depicts a simplified organization of the components of an exemplary memory 210 of the computing system 200. As illustrated, the memory 210 includes a server-side device management application 140, data 160 including, at least, a devices database 162, a policies database 164, and an administrator database 166, and an operating system 180. In some embodiments, two or more of the databases 162, 164 and 166 may be jointly implemented in a single data store. For example, the data in the devices database 162 and policies database 164 may be stored in a single database.

The server-side device management application 140 may be used by an administrator to control one or more managed devices. The management application 140 may, for example, provide an interface (e.g. console) for an administrator to use in managing devices. For example, the management application 140 may be used to select commands, policies, settings, etc. for distribution to managed devices. As a further example, the management application 140 may be used for remotely configuring managed devices. More generally, the management application 140 enables an administrator to perform various server-side tasks relating to, for example, data collection and analysis, distribution of device management policies, remote configuration of managed devices, and compliance audit and reporting.

The operating system 180 is software. The operating system 180 may, for example, be Apple iOS (™), Google (™) Android (™), Linux (™), Microsoft (™) Windows (™), or the like.

The devices database 162 comprises a repository of device information for devices that have been managed or are currently being managed by, or enrolled with, one or more device management services associated with the management server/system 200. The devices database 162 may store, for one or more managed devices, device data indicating at least a device identifier, a device type, manufacturer, owner, and/or user identifiers, operating system or platform, and time and duration of device management. The devices database 162 may be updated manually as entries for newly enrolled devices are added or as entries for unenrolled devices are deleted. Alternatively, the devices database 162 may be updated automatically when a device is enrolled or unenrolled.

The policies database 164 may include definitions of policies, rules, and settings that one or more device management services creates and deploys to enrolled devices. A wide range of different policies may be provided. The policies database 164 may include, for example, security policies, device customization settings, connectivity profiles, software updates, device management constraints for subsequent enrollments, remote device configuration/control settings, access control policies, and network configuration settings. In some embodiments, the policies database 164 may be integrated with the devices database 162. In particular, the data from the policies database 164 and the devices database 162 may be combined. For example, the data from these databases may indicate mappings of policies to different enrolled devices. The mappings may, for example, identify policies that have: already been applied by one or more enrolled devices; previously deployed to, but not yet applied by, one or more enrolled devices; or pending deployment. The policies database 164 may be updated when the administrators of the device management services provide definitions of policies, rules, etc. for deploying to their enrolled devices.

The administrator database 166 may store data identifying the administrators, or managing entities, of a device management service associated with the management server. In particular, the administrator database 166 may contain authentication data for verifying the identities of administrators that are authorize to manage one or more devices via the management server. The server restricts management privileges of administrators so that an administrator is only able to conduct those management tasks for which it has express authority.

Figure 3:
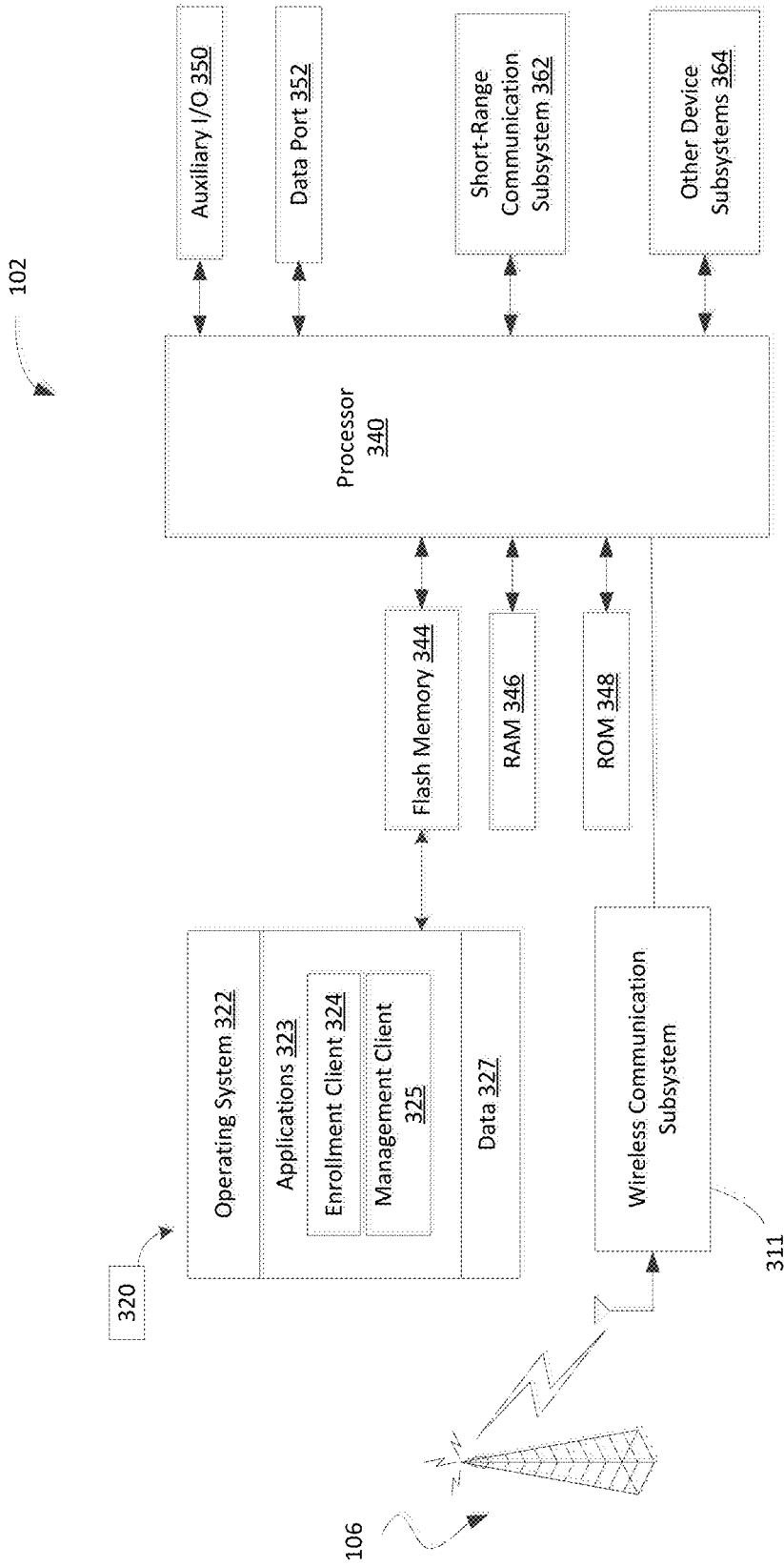
FIG. 3 is a block diagram illustrating an example user device.

Reference is now made to FIG. 3, which illustrates an example first device 102. The first device 102 may be any IoT device that is configured for network connectivity. More specifically, the first device 102 may be any object that is equipped with electronics, sensors, actuators, etc. that enable the object to connect, collect, and exchange data via a computer network, such as the Internet.

The first device 102 includes a controller. The controller includes at least one processor 340 (such as a microprocessor) which controls the overall operation of the first device 102. The processor 340 interacts with device subsystems such as a wireless communication subsystem 311 for exchanging radio frequency signals with a wireless network (such as network 106) to perform communication functions. The processor 340 interacts with additional device subsystems, including flash memory 344, random access memory (RAM) 346, read only memory (ROM) 348, auxiliary input/output (I/O) subsystems 350, a short-range communication subsystem 362, and other device subsystems (generally designated as 364). Some of the subsystems shown in FIG. 3 perform communication-related functions, whereas other subsystems may provide "resident" or on-device functions.

The particular design of the wireless communication subsystem 311 depends on the wireless network 106 in which the first device 102 is intended to operate. The wireless network 106 may include a wireless wide area network (WWAN) or a wireless local area network (WLAN).

The first device 102 may store data 327 in an erasable persistent memory, which in one example embodiment is the flash memory 344. In various example embodiments, the data 327 may include service data having information required by the first device 102 to establish and maintain communication with the wireless network 106. The data 327 may also include user application data such as email messages, address book and contact information, calendar and schedule information, notepad documents, image files, and other commonly stored user information stored on the first device 102 by its user, and other data. The data 327 stored in the persistent memory (e.g. flash memory 344) of the first device 102 may be organized, at least partially, into a number of databases or data stores each containing data items of the same data type or associated with the same application. For example, email messages, contact records, and task items may be stored in individual databases within the first device 102 memory.

The short-range communication subsystem 362 is an additional optional component which provides for communication between the first device 102 and different systems or devices, which need not necessarily be similar devices. For example, the short-range communication subsystem 362 may include an infrared device and associated circuits and components, or a wireless bus protocol compliant communication mechanism such as a Bluetooth® communication module to provide for communication with similarly-enabled systems and devices.

A pre-determined set of applications that control basic device operations, including data and possibly voice communication applications may be installed on the first device 102 during or after manufacture. Additional applications and/or upgrades to an operating system 322 or software applications 323 may also be loaded onto the electronic device 102 through the wireless network 101, the auxiliary I/O subsystem 350, the data port 352, the short-range communication subsystem 362, or other suitable device subsystems 364. The downloaded programs or code modules may be permanently installed, for example, written into the program memory (e.g. the flash memory 344), or written into and executed from the RAM 346 for execution by the processor 340 at runtime.

The processor 340 operates under stored program control and executes software modules 320 stored in memory such as persistent memory; for example, in the flash memory 344. As illustrated in FIG. 3, the software modules 320 may include operating system software 322 and one or more additional applications 323.

Figure 5:
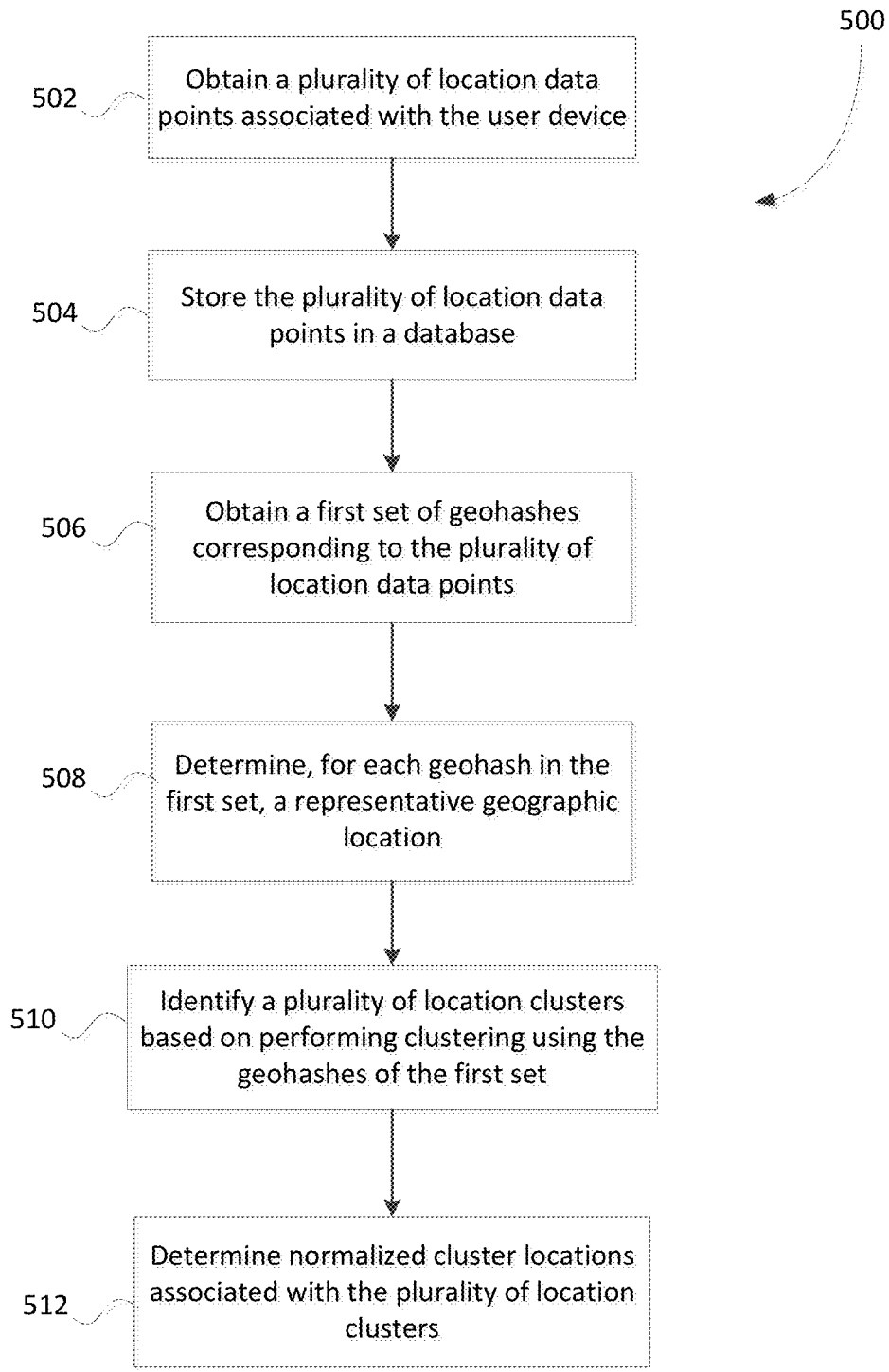
FIG. 5 shows, in flowchart form, an example method for determining normalized locations of clusters that are formed based on geographic location data associated with a user device.

Reference is made to FIG. 5 which shows, in flowchart form, an example method 500 for determining normalized locations of clusters that are formed based on geographic location data associated with a user device. The method 500 may be implemented by one or more processors of a computing system. Specifically, the operations of method 500 may be performed by a server which is communicably connected to and manages a plurality of mobile devices. For example, an MDM server which manages deployed user devices of an organization may perform the method 500. As another example, the method 500 may be performed by a server which manages one or more applications on deployed devices.

In at least some embodiments, the method 500 may be implemented as part of a method for controlling usage of a user device or certain managed applications on a user device. For example, an MDM server may implement the method 500 as a sub-method of a process for selecting suitable security settings for a user device managed by the server. As another example, a server which manages business applications that are deployed on a user device may control access settings for the applications based on the operations of method 500.

In operation 502, the server obtains a plurality of location data points associated with the user device. That is, the server obtains data describing the location of the user device at various different times. Each location data point represents a location of the user device at a specific point in time. In particular, a location data point includes geographic coordinates. For example, a location data point may specify, at least, a latitude coordinate and a longitude coordinate associated with the user device.

In some embodiments, a location data point may include various different types of information relating to a current location of the user device. For example, the location data point may include behavioral attributes associated with the current location. Such behavioral attributes may, for example, indicate a time of day (i.e. when location data point is obtained), a day of week, particular floor or region of a building, current motion state of user device (e.g. static or moving), and usage status of user device (e.g. airplane mode, unlocked, in active use, etc.). In this way, a location data point associated with a user device may be referred to as describing multi-dimensional, or n-dimensional, location data for the user device. In particular, a location data point need not be limited to specifying physical geographical coordinates of a user device.

The server obtains location data points associated with a user device based on data transmitted by the user device. In some embodiments, the server may automatically receive device location data from the user device. For example, the user device may be configured to transmit location data to the server at regular intervals, or when certain predefined conditions are met. The location data may, for example, be transmitted via an application on the user device which uses an API to extract location information from the device's hardware. The user device may indicate its location to the server, for example, when the device is detected to be in motion, the device is unlocked by a user, or when data and/or services (e.g. applications) on the device are accessed. In some embodiments, the server may directly poll the user device for location information. For example, the device may be polled according to a predefined schedule, or when the device is used to access location-based services.

In operation 504, the server stores the plurality of location data points in a database. In some embodiments, the database may be a look-up dictionary. A stored location data point may indicate, at least, geographic coordinates for the location data point, a time stamp associated with the location data point, and a security mode that is enabled for the user device at the time location data was collected. As explained above, a location data point may also include behavioral attributes relating to a device location associated with the user device.

In operation 506, the server obtains a first set of geohashes corresponding to the plurality of location data points. Geohash is a public domain geocode system which encodes a geographic location into a string comprising letters and digits. Each location data point is processed to encode explicit geographic (i.e. longitude, latitude) coordinates into a corresponding string, i.e. geohash. The article entitled "Geohash Index Based Spatial Data Model for Corporate" by Iping Supriana Suwardi et al., published in the proceedings of the 5th International Conference on Electrical Engineering and Informatics 2015, provides examples of conversion of a position (defined by a longitude and a latitude) into a hash string (i.e. a geohash). It should be noted that different location data points can have a same geohash value. In particular, a geohash with a given length will reference a geographic region of specific size, and the location data points within the geographic region are "covered" by the geohash. A planar geographic map can be split into rectangles or cells or boxes where some close location data points can belong to a same rectangle or cell or box. For example, a geohash with a length of 7 symbols of 32 bits is associated with a rectangle or cell or box of width around 153 meters, and of height around 153 meters. The first set contains all of the geohashes corresponding to the plurality of location data points, and each location data point maps to a unique one of the geohashes of the first set. The geohash is a unique identifier for a given geographic location. That is, while multiple different location data points may be mapped to a single geohash, a location data point may not be mapped to multiple geohashes.

A suitable algorithm for generating geohashes may be used in operation 506. In at least some embodiments, the server may specify a level of precision for the generated geohashes. For example, the server may require that the geohashes have a precision of 10 digits. More generally, the server may select a precision level of between 6 and 12 digits for the geohashes. The choice of precision level may be based on various factors, such as the total number of location data points, any limits (e.g. maximum) on number of location data points which map to a same geohash, and sensitivity or accuracy of software/hardware used to determine location.

The obtained geohashes of the first set are saved in a database. In at least some embodiments, the plurality of location data points may be stored in association with their corresponding geohashes in a database. For example, the location data points and the geohashes may be saved in a look-up dictionary data structure.

In operation 508, the server determines, for each geohash in the first set, a representative geographic location. The representative geographic location for a geohash reflects the actual locations of the user device within the geographic area associated with the geohash. In particular, the representative geographic location may be a representation of the actual distribution of the locations of the user device within a geographic region that is identified by the geohash (i.e. a grid cell). The representative geographic location may, for example, indicate the actual locations within a "bounding box" of the cell identified by a geohash where device usage concentrated, rather than an arbitrary point (e.g. center) of the bounding box.

The representative geographic location is determined based on the stored geographic coordinates of location data points that map to the geohash. In at least some embodiments, determining the representative geographic location for a geohash comprises computing a centroid of the location data points associated with the geohash. The coordinates of the centroid may be computed as the arithmetic mean of the geographic coordinates of the location data points. The representative geographic location may be stored in the database in association with the geohash and/or the location data points.

In operation 510, the server identifies a plurality of location clusters based on performing clustering using the geohashes of the first set. Cluster analysis of the location data points is performed using the "geohash" values associated with the location data points as single categorical values, as opposed to latitude and longitude values as two continuous variables. Various known clustering techniques may be employed to identify clusters for the location data points associated with the user device. For example, clustering may be performed by grouping the geohashes of the first set based on their prefixes. The server may, for example, indicate a prefix length and clusters of location data points may be formed based on string comparison of the geohashes.

The clustering operations may be performed by a system that is remote from the server. For example, the location data points associated with the user device may be transmitted to a remote system that is optimized to perform clustering operations, and cluster data may be received at the server from the remote system. In this way, the real-time operations of the MDM server may not be affected by clustering operations which may require significant computing (e.g. CPU) resources.

Where the location data points comprise multi-dimensional location data associated with a user device, the clustering may be performed based on both geographic and non-geographic location data. In particular, the clustering operations may be informed by behavioral attributes specified by the location data points associated with the user device. For example, location data points may be clustered based on a multi-dimensional clustering operation. In some embodiments, location data points may be represented by n-tuples that include geographic and non-geographic (e.g. behavioral attribute) data, and clustering may be performed using the n-tuples. Various different similarity metrics may be used in deriving a plurality of clusters from the location data points.

Once the clusters are formed, a decoding operation is performed to translate the geohashes back into explicit latitude and longitude coordinates. In operation 512, the server determines normalized cluster locations associated with the plurality of location clusters. The normalized cluster locations are determined based on the representative geographic locations associated with the geohashes of the first set. In particular, the representative geographic locations are used during the decoding operation so that the locations of clusters formed reflect the actual locations of device usage within the geohashes' bounding boxes.

Figure 4A:
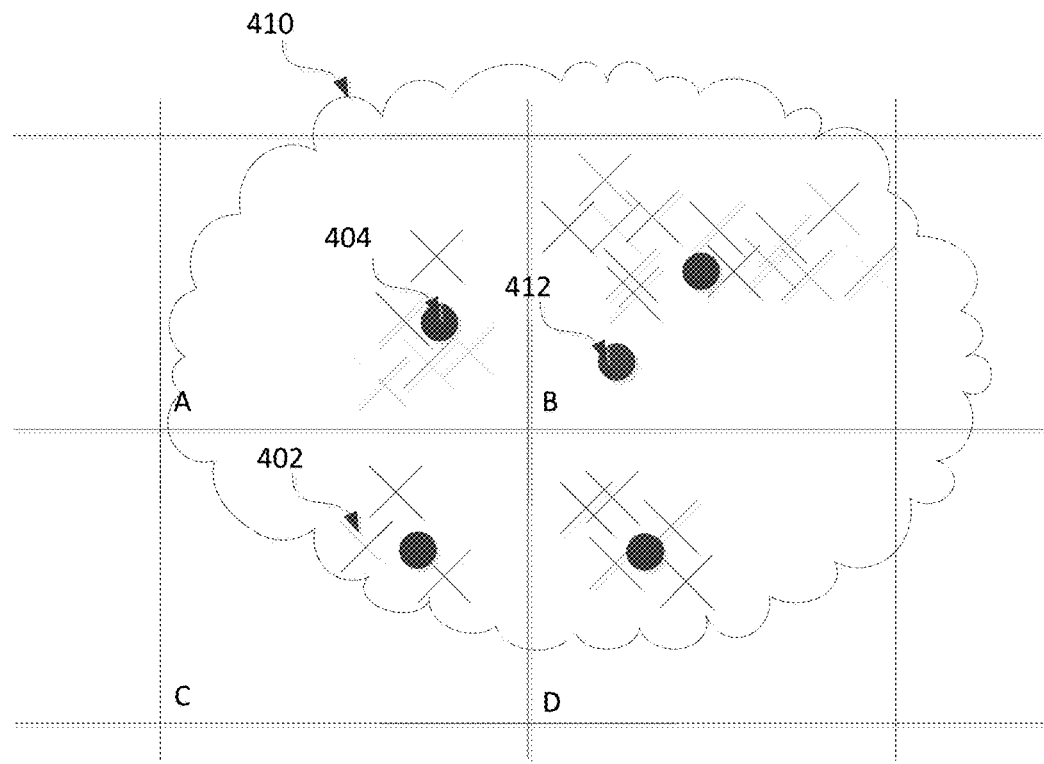
FIGS. 4A and 4B are schematic diagrams illustrating clusters of device location data points.
Figure 4B:
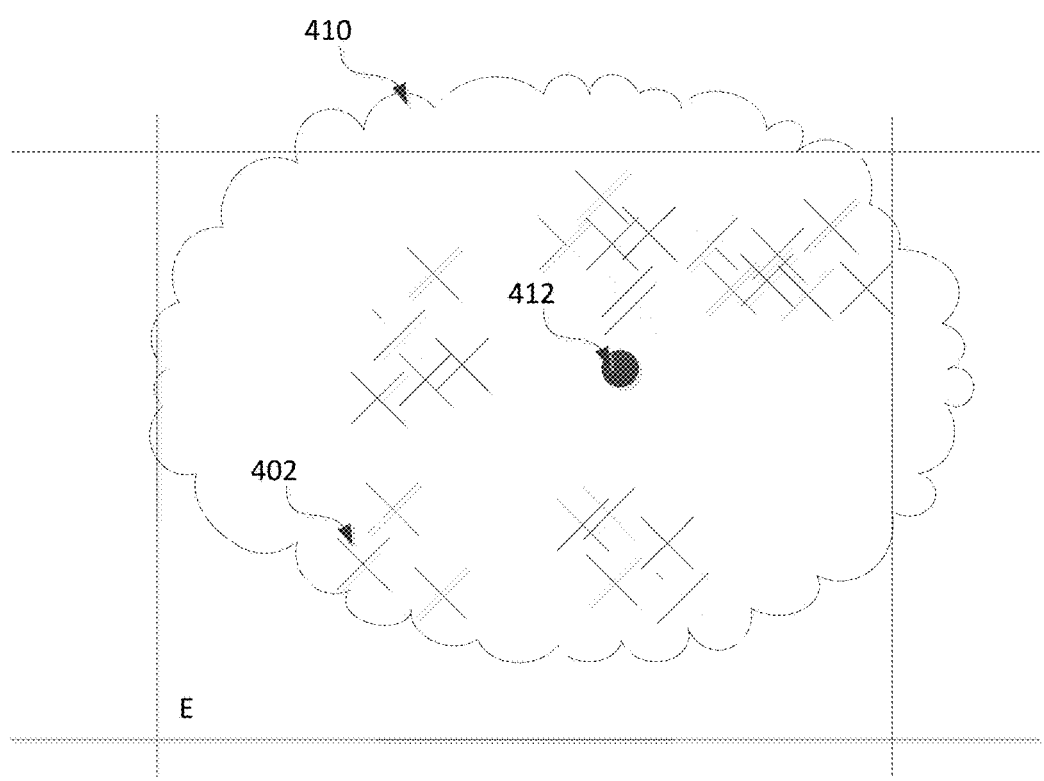

A normalized location of a cluster may refer to a specific geographic location, identified by geographic coordinates. FIGS. 4A and 4B are schematic diagrams illustrating clusters of device location data points. The "X" marks 402 represent the locations of a user device at different times. Specifically, FIGS. 4A and 4B illustrate the ways in which a server determines a normalized location of a cluster of location data points. For ease of illustration, the "X" marks 402 in FIGS. 4A and 4B are assumed to be location data points that are assigned to a single cluster 410.

In accordance with example embodiments, the server determines a representative geographic location associated with each of one or more geohashes. In FIG. 4A, the grid cells "A", "B", "C" and "D" correspond to different geohashes. For each grid cell, a different representative geographic location 404 is determined. The representative geographic location 404 for a grid cell may, for example, be the centroid of the location data points that are in the grid cell. In some embodiments, the representative geographic location 404 for a grid cell may be obtained by determining a weighted arithmetic mean of the coordinates of the location data points of the grid cell. The location data points of a grid cell may be associated with respective weights based on various factors such as, for example, length of time that the user device remains at the location, frequency of visits of the user device to the location, and status (e.g. sleep mode, in-use, unlocked, etc.) of the user device at the location.

As shown in FIG. 4A, four different representative geographic locations 404 are determined, one for each grid cell, i.e. geohash. The server may then determine a normalized cluster location 412 for the cluster 410 based on the four representative geographic locations 404. For example, the normalized cluster location 412 may comprise a weighted arithmetic mean of the coordinates of the representative geographic locations 404.

In FIG. 4B, a single grid cell "E" corresponds to the geohash to which the location data points 402 of cluster 410 are mapped. In this case, the normalized cluster location 412 may correspond to the representative geographic location associated with the geohash. That is, the normalized cluster location 412 may have the same geographic coordinates as the representative geographic location in grid cell "E".

In this way, the representative geographic locations of geohashes are used in the geohash decoding operations to determine normalized cluster locations. The normalized locations of clusters formed are reflective of the distribution of device locations and, thus, may accurately inform device usage patterns. Furthermore, the use of representative geographic locations during decoding allows explicit distance calculations to be performed during subsequent risk assessment operations without a loss of precision and with the ability to map the device's current behavior to actual past behavior.

In some embodiments, the normalized location of a cluster may be identified by one or more geohashes to which the location data points of the cluster are mapped. For example, in FIG. 4A, the normalized location of cluster 410 may be described by indicating the grid cells (i.e. grid cells "A", "B", "C" and "D") in which the location data points of the cluster are located. Similarly, in FIG. 4B, the normalized cluster location may refer to the grid cell "E" in which all of the location data points of the cluster 410 are located.

Figure 6:
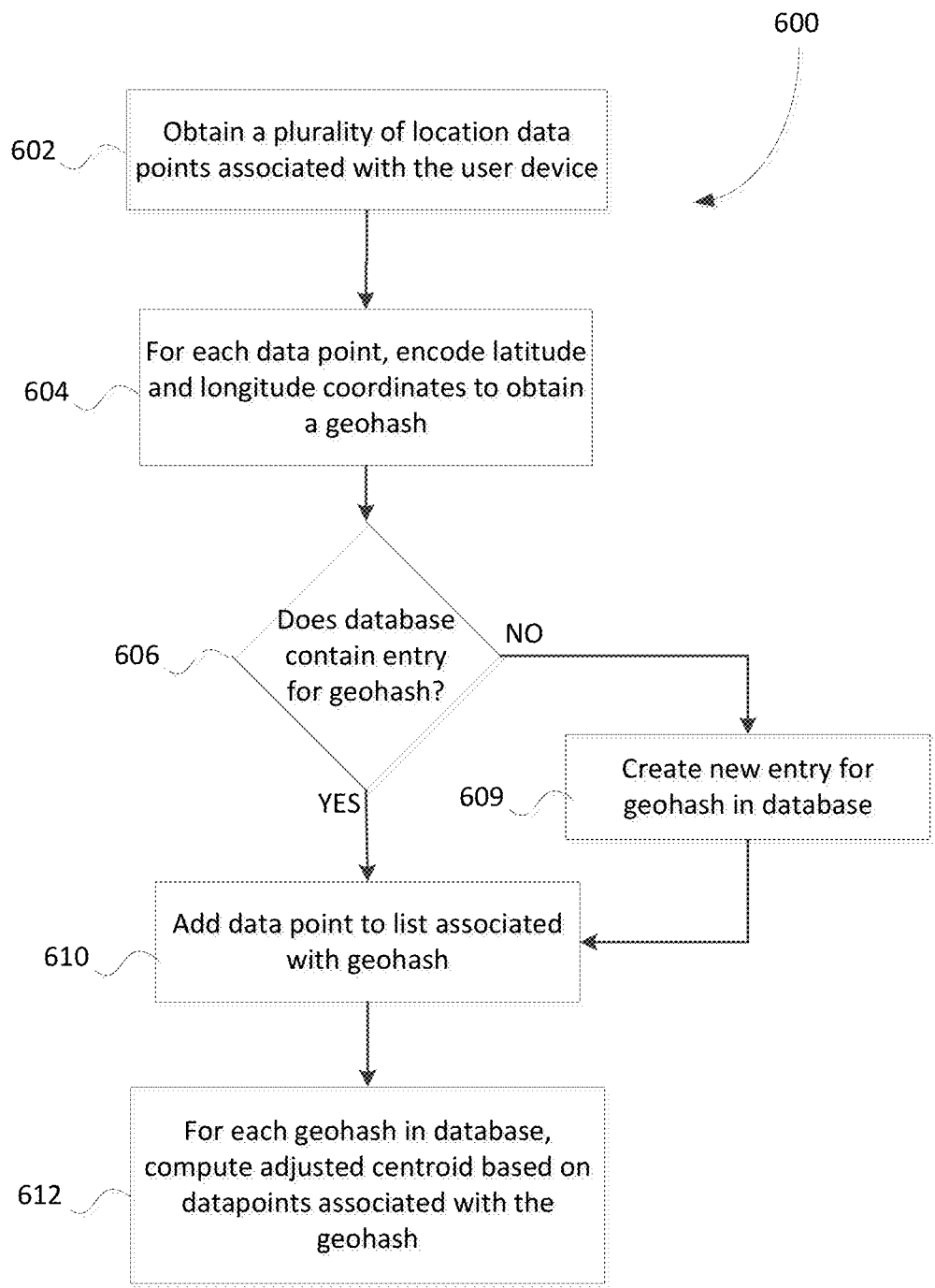
FIG. 6 shows, in flowchart form, another example method for determining normalized locations of clusters that are formed based on geographic location data associated with a user device.

Reference is made to FIG. 6 which shows, in flowchart form, an example method 600 for determining normalized locations of clusters that are formed based on geographic location data associated with a user device. The method 600 may be implemented by one or more processors of a computing system. Specifically, the operations of method 600 may be performed by a server, such as an MDM server, which is connected to and manages a plurality of mobile devices.

In operation 602, the server obtains a plurality of location data points associated with the user device. That is, the server obtains data describing the locations of the user device at a plurality of different times. Each location data point includes geographic coordinates. For example, a location data point may specify latitude and longitude coordinates of a geographic location associated with the user device.

For each location data point, the server encodes the latitude and longitude coordinates to obtain a corresponding geohash, in operation 604. Each location data point maps to a respective geohash. In particular, for each location data point, a mapping exists which maps the location data point to a unique geohash. While multiple different location data points may be mapped to a single geohash, a location data point may not be mapped to multiple geohashes.

The location data point and geohash data may be stored in a database connected to the server. Once a location data point is encoded to a geohash, the server determines whether the database contains an entry for the geohash, in operation 606. If the database does not contain such an entry (i.e. first instance of the geohash), a new entry for the geohash is created in the database in operation 608. The location data point is then stored in association with the newly created entry for the geohash. Specifically, the geographic coordinates of the location data point may be stored in association with the geohash in the database. For example, the geographic coordinates may be added to a list of location data points that are associated with the geohash. If the database does contain an entry for the geohash, in operation 610, the location data point is added to an existing list for the geohash in the database.

The server determines, for each of the geohashes generated from the plurality of location data points, a representative geographic location. The representative geographic location for a geohash reflects the actual locations of the user device within the geographic region associated with the geohash. In particular, the representative geographic location may be a representation of the actual distribution of the locations of the user device within a geographic region that is identified by the geohash (i.e. a grid cell). In operation 612, the representative geographic location for each geohash is determined by computing a centroid that represents an arithmetic mean of the geographic coordinates of location data points which map to the geohash. That is, the latitude and longitude coordinates of the representative geographic location may comprise averages of the latitude and longitude coordinates of the location data points corresponding to the geohash. In some embodiments, the geographic coordinates of the individual location data points which are stored in the database may be replaced by the coordinates of the representative geographic location. For example, once the representative geographic location for a geohash is computed, the location data points that map to the geohash may be deleted and replaced by coordinates of the representative geographic location in the database.

Figure 7:
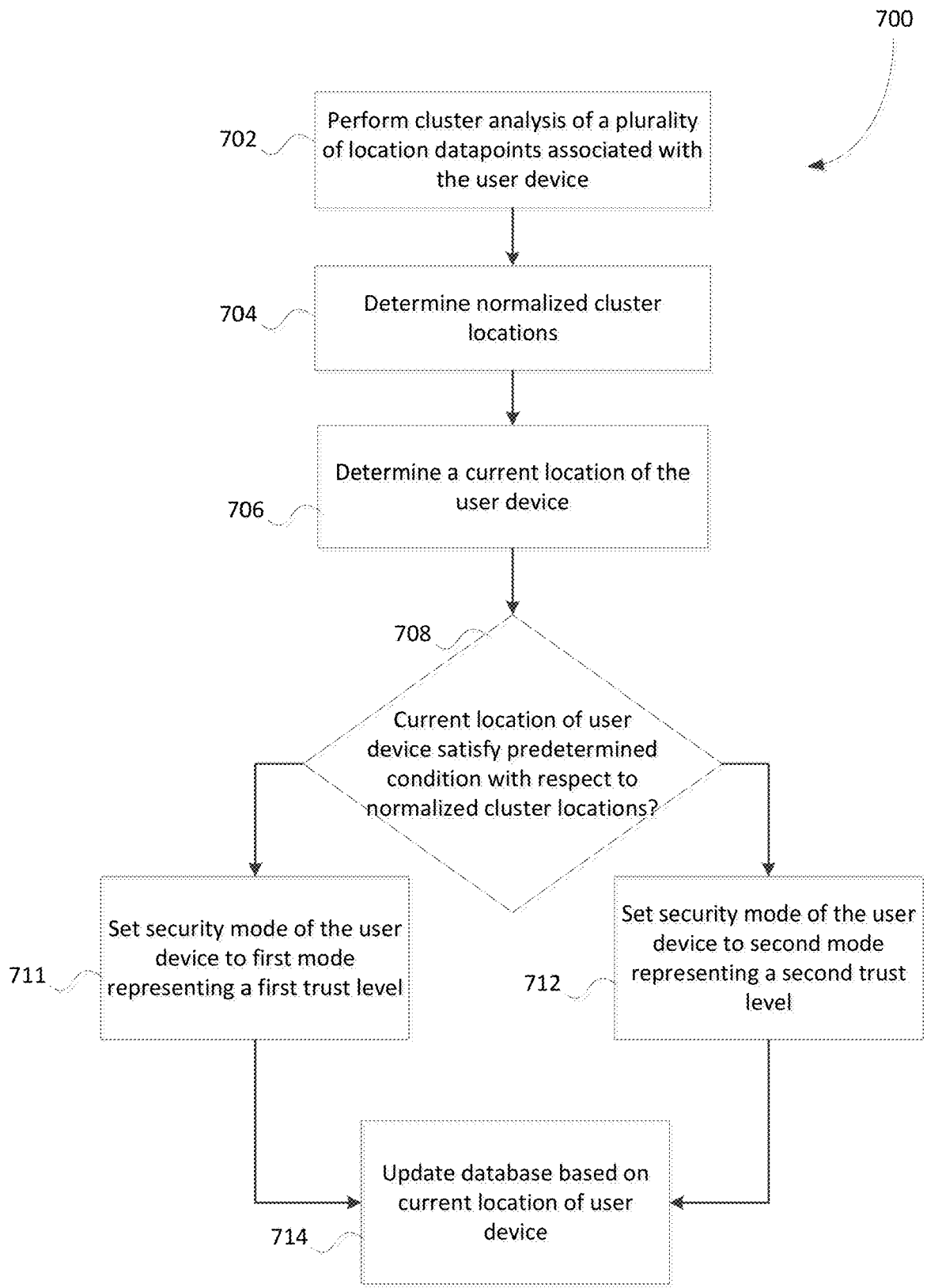
FIG. 7 shows, in flowchart form, an example method for controlling device usage permissions for a user device.

Reference is made to FIG. 7 which shows, in flowchart form, an example method 700 for controlling device usage permissions for a user device. The method 700 may be implemented by one or more processors of a computing system. Specifically, the operations of method 700 may be performed by a server, such as an MDM server, which is connected to and manages a plurality of mobile devices. For example, an MDM server may implement the method 700 when remotely managing the security settings for a deployed mobile device.

In operation 702, the server performs location-based cluster analysis of a plurality of location data points associated with the user device. In particular, clusters are formed using geohashes associated with the location data points. The cluster analysis may proceed in accordance with the operations of methods 500 and 600 described above. For example, the clustering may be performed based on string comparisons of the geohashes that are generated from the location data points.

In operation 704, the server determines normalized locations of clusters that are formed from the location data points associated with the user device. In particular, for each generated geohash, the server may compute coordinates of a representative geographic location for the geohash, and use the representative geographic location information in identifying normalized cluster locations when decoding the geohashes corresponding to the clusters. The identification of normalized cluster locations may proceed in a similar manner as operation 512 described above.

In operation 706, the server determines a current location of the user device. For example, the server may obtain geographic coordinates of the device's current location. The server may receive the location data from the user device. In some embodiments, the user device may automatically transmit its location to the server, for example, at predetermined regular intervals, upon detecting certain client-side changes (e.g. user device is in motion), and/or when certain predefined conditions are satisfied (e.g. user device is more than a threshold distance away from previous location). The transfer of location data to the server may thus be initiated at the user device.

In some embodiments, the server may directly poll the user device for its location information. For example, if the server receives a request originating from a user device for permission to access certain location-based services on the user device, the server may poll the user device for location data. The user device's location data may, in turn, be used to determine whether access to requested location-based services on the device should be granted. As another example, a user device, or an application on a user device, may request access to access-controlled resources that are not on the device. The server may consider the device's location and context risk level when deciding whether to grant access to the resources.

More generally, before being allowed to access an enterprise- or cloud-based server, a user device, or application on a user device, may need to get permission from the server, and the server may evaluate the risk of the user device's location and behavioral attributes before granting that access.

The server may determine a relative location of the user device with respect to one or more of the normalized cluster locations. For example, the server may determine a distance between the current location of the user device and at least one of the normalized cluster locations. The "distance" between the current location of the user device and a normalized cluster location may be defined in various ways. For example, the distance to a normalized cluster location may be defined as the distance to a specific point in the cluster, such as a centroid of the cluster or a location data point assigned to the cluster. Alternatively, the distance to a normalized cluster location may be defined as the shortest (i.e. perpendicular) distance to a grid cell represented by a geohash associated with the cluster.

Based on the distance calculations, the server may identify those clusters which are closest to the current location of the user device. In operation 708, the server determines whether the current location of the user device satisfies a predetermined condition with respect to the normalized locations of the clusters. The server then selects a security policy for the user device based on the determination at operation 708. In some embodiments, selection of a security policy may include processing requests to access certain service(s) on the user device. A requested service (e.g. application) on the user device may access sensitive data. The security setting for the service may stipulate that the service is available only when the user device is determined to be located in a "trusted" region, where the risk of device loss or unauthorized access by an attacker may be low. By selecting a security policy for the user device, the server may effectively either approve or reject a request to access a service on the user device.

In at least some embodiments, the predetermined condition may be used for distinguishing between regions which are associated with different trust levels. If the current location of the user device satisfies the predetermined condition, the server sets the security mode of the user device to a first mode associated with a first trust level, in operation 711. For example, the security mode of the user device may be set to a mode representing low risk (of exposure to attack, etc.). Otherwise, if the current location does not satisfy the predetermined condition, the server sets the security mode of the user device to a second mode associated with a second trust level, in operation 712. For example, the security mode of the user device may be set to a mode representing high risk.

While the method 700 of FIG. 7 is described using only two security modes, it will be understood that different implementations may have more than two security modes to which a user device can be set. For example, a user device may have multiple (e.g. three or more) different security modes which define a range of trust levels. Accordingly, the predetermined condition may allow for more than just two possible outcomes/states. That is, the security mode of the user device may be set to one of a plurality of different possible security modes depending on the assessment of the current device location against one or more predetermined conditions.

In some embodiments, the security mode may be set to the first mode if the current location of the user device is determined to be within a predefined threshold distance from a normalized cluster location. The proximity to a normalized cluster location may be an indication that the current device location is close to a "trusted region" corresponding to a geographic area where the user's device usage tended to concentrate. By defining a suitable threshold distance, the security policy may be reliably set for the user device in response to determining that the user device is located inside a trusted region. If, on the other hand, the current location of the user device is not within a predefined threshold distance from any of the normalized cluster locations, then the security policy may be set to the second mode.

In some embodiments, the server may determine, for each of the plurality of location clusters, a frequency value representing a number of the location data points associated with the location cluster. The security policy for the user device may then be selected based on a determination of whether a frequency value of the at least one location cluster exceeds a predefined threshold number. In particular, a geographic region may be identified as a "trusted region" if the number of instances of device usage within the region exceeds a certain threshold.

A region may be labeled as a "trusted region" if a frequency value associated with the region, representing a number of location data points which belong to the region, is determined to be greater than a threshold number. A frequency value may refer to a frequency in the context of a specific user device, or a cumulative frequency for a plurality of different user devices. Generally speaking, the more users there are exhibiting a shared behavior, the more "trustable" the behavior may be. A high cumulative frequency value for a region (or location cluster) may represent greater likelihood that the region/cluster is associated with a high trust level. An example of such a case would be a shared office space where multiple users and their devices fall within the same region/zone defined by a geohash and contribute to the same location cluster. Accordingly, the server may, in operation 712, obtain location data points associated with one or a plurality of different user devices.

In operation 714, the server may update a database based on the current location of the user device. For example, the current device location may be stored (e.g. in a database) in association with a security mode that is enabled for the user device.

Figure 8:
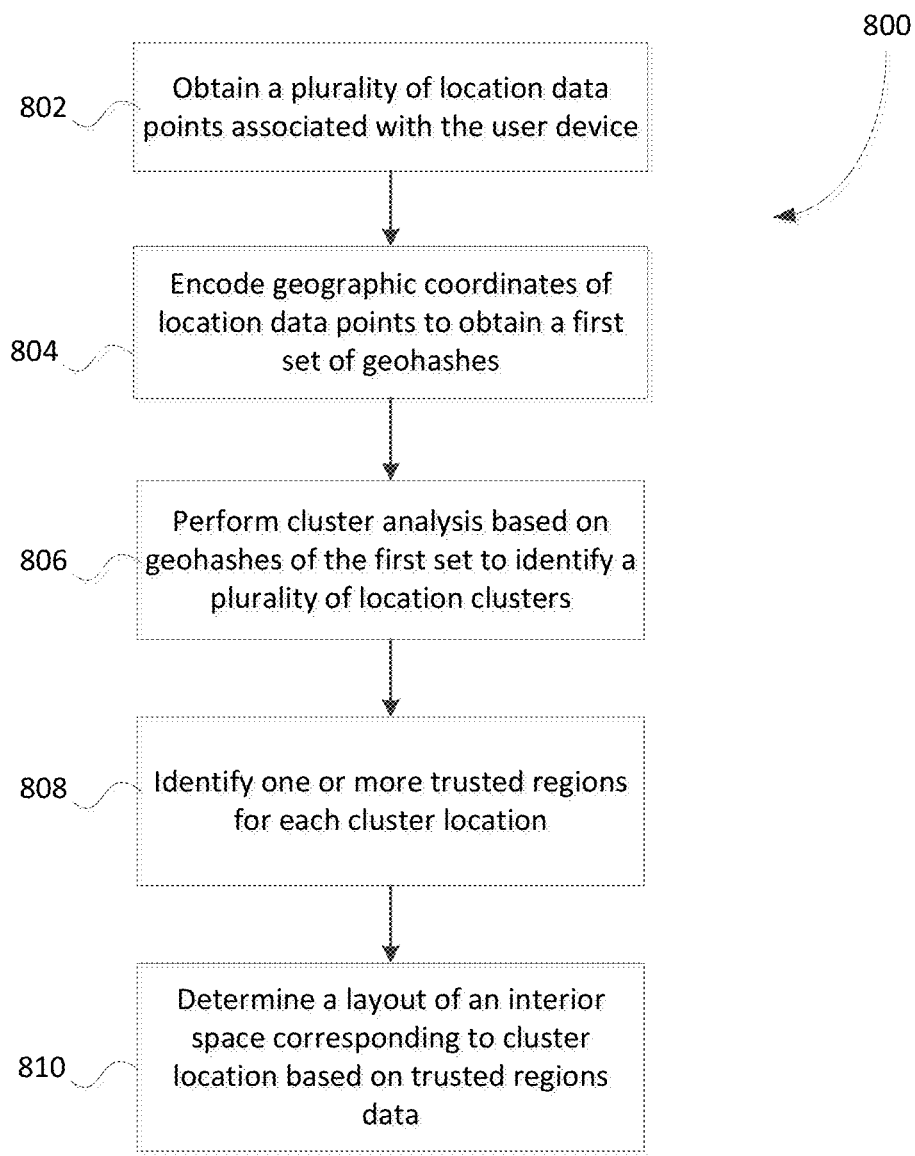
FIG. 8 shows, in flowchart form, an example method for determining an interior layout of a space based on clustering analysis of geographic location data associated with a user device.

Reference is made to FIG. 8 which shows, in flowchart form, an example method 800 for determining a layout of an interior space. The interior layout is determined based on clustering analysis of geographic location data associated with a user device. The method 800 may be implemented by one or more processors of a computing system. Specifically, the operations of method 700 may be performed by a server, such as an MDM server, which is connected to and manages a plurality of mobile devices.

Operations 802, 804 and 806 may be performed in a similar manner as operations 502, 506 and 510 of method 500 described above. In operation 802, the server obtains a plurality of location data points associated with the user device. The geographic coordinates of the location data points are encoded to obtain a first set of geohashes, in operation 804. A cluster analysis of the location data points is performed by the server, in operation 806, using the generated geohashes. For example, one or more clusters of location data points may be formed based on string (e.g. prefix) comparisons of the geohashes of the first set.

Once the clusters are formed, the server may identify one or more trusted regions associated with the clusters, in operation 808. In some embodiments, the server may determine, for each generated geohash, a representative geographic location as well as trusted regions around the representative geographic location. By way of example, the representative geographic location of a geohash may be computed as a centroid of the location data points which map to the geohash (i.e. arithmetic mean of the geographic coordinates), and the server may calculate a variance and/or standard deviation of the coordinates in addition to the arithmetic mean. The variance and standard deviation may be saved in association with the representative geographic location coordinates. This information may be used in programmatically defining a trustable "perimeter" or area around the centroid that reflects a user's actual range of movement within the grid cell represented by the geohash (es).

In operation 810, the server may determine an approximate layout of an interior space based on the trusted regions data. In particular, the server may develop a model of the interior space by combining spatial data of the trusted regions associated with the clusters formed from the location data points of the user device. For example, the server may identify one or more trusted regions and overlaps between such trusted regions in arriving at an approximation of an interior layout. In this way, a "polygon" that reflects a shape of the interior space may be computed by the server.

Figure 9:
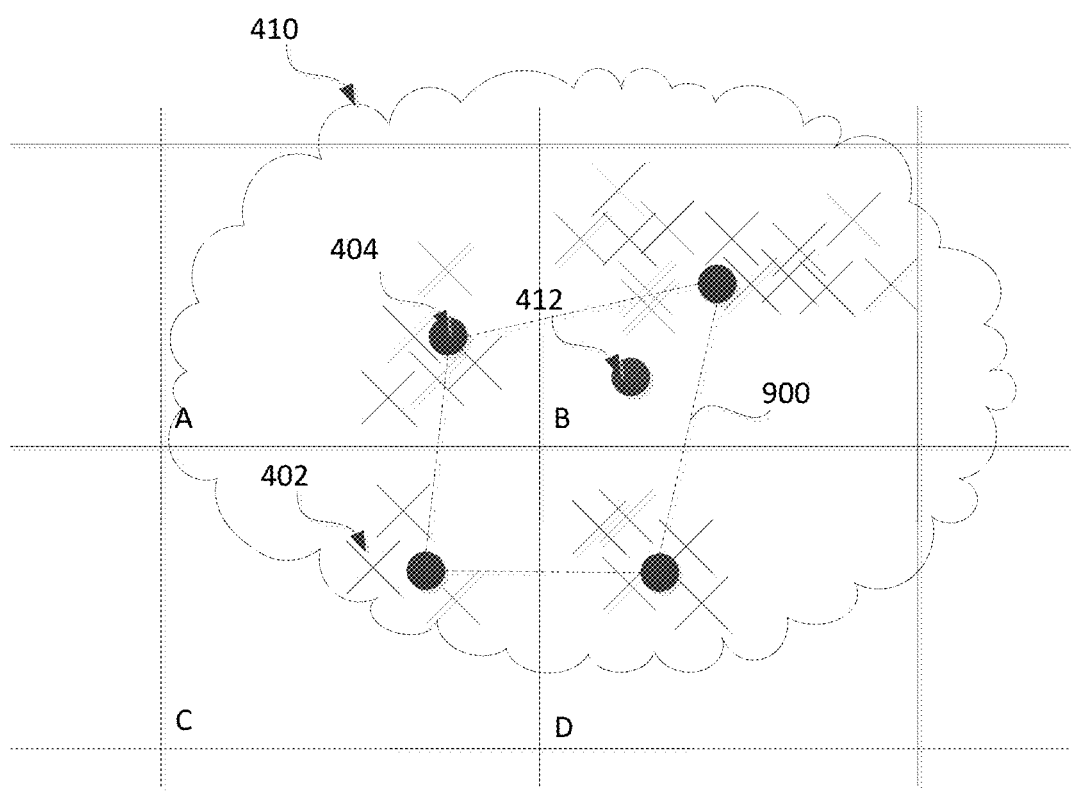
FIG. 9 shows an illustration of determining an approximate layout of an interior space, in accordance with example embodiments of the present disclosure.

FIG. 9 provides an example illustration of determining an approximate layout of an interior space. A plurality of grid cells ("A", "B", "C" and "D") corresponding to different geohashes are shown in FIG. 9, and a representative geographic location 404 is identified for each of the grid cells. The geohashes may, for example, correspond to clusters that are formed based on location data points associated with a user device. The representative geographic locations 404 may be used in defining a polygon which approximates the layout of an interior space. For example, as shown in FIG. 9, the representative geographic locations 404 may be the vertices of a polygonal boundary 900 corresponding to a trusted region for the user device. In some embodiments, the polygonal boundary 900 may be used as a starting point, or sub-region, from which a more accurate layout of the interior space may be obtained. For example, the polygonal boundary 900 may be taken as a sub-region of the interior space, and additional areas that are determined to be sub-regions of the interior space can be joined with the polygonal boundary 900. The additional sub-regions may, for example, be obtained based on modeling the movement of the user device and identifying other trusted regions for the user device.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor-implemented method, comprising:
   obtaining a plurality of location data points associated with a user device, each location data point including geographic coordinates;
   storing, in a database, the plurality of location data points;
   obtaining a first set of geohashes corresponding to the plurality of location data points, each location data point mapping to one of the geohashes of the first set;
   determining, for each geohash in the first set, a representative geographic location based on stored geographic coordinates of location data points which map to the geohash;
   identifying a plurality of location clusters by performing clustering based on string comparison using the geohashes of the first set;

determining normalized cluster locations associated with the plurality of location clusters based on the representative geographic locations associated with the geohashes of the first set;

receiving, via the user device, a request to access a first remote resource;

determining that a current location of the user device is within a predefined threshold distance from a first one of the normalized cluster locations; and in response to determining that the current location of the user device is within the predefined threshold distance from the first normalized cluster location, granting, to the user device, access to the first remote resource.

2. The method of claim 1, wherein the geographic coordinates include latitude and longitude coordinates associated with the user device.

3. The method of claim 1, wherein determining the representative geographic location for a geohash comprises computing a centroid representing an arithmetic mean of the geographic coordinates of location data points which map to the geohash.

4. The method of claim 3, further comprising computing at least one of variance or standard deviation for latitude and longitude coordinates of the location data points which map to the geohash.

5. The method of claim 1, further comprising:
determining relative device location for the user device, the relative device location indicating the current location of the user device relative to one or more of the normalized cluster locations; and
selecting a security policy for the user device based on the relative device location.

6. The method of claim 5, wherein selecting the security policy comprises selecting a first security mode in response to determining that the current location of the user device is within a predefined threshold distance from a normalized cluster location associated with at least one of the plurality of location clusters.

7. The method of claim 6, further comprising determining, for each of the plurality of location clusters, a frequency value representing a number of the location data points associated with the location cluster, wherein selecting the security policy comprises selecting a security mode for the user device based on a determination of whether a frequency value of the at least one location cluster exceeds a predefined threshold number.

8. The method of claim 5, wherein selecting the security policy comprises selecting a second security mode in response to determining that the current location of the user device is not within a predefined threshold distance from any of the normalized cluster locations.

9. The method of claim 1, wherein obtaining the first set of geohashes comprises converting, for each of the plurality of location data points, geographic coordinates associated with the location data point to a geohash.

10. The method of claim 1, wherein storing the plurality of location data points in the database comprises storing, for each of the location data points, geographic coordinates of the location data point in association with a geohash of the first set to which the location data point maps.

11. A computing system, comprising:
memory; and
a processor coupled to the memory, the processor being configured to:
obtain a plurality of location data points associated with a user device, each location data point including geographic coordinates;
store, in a database, the plurality of location data points;
obtain a first set of geohashes corresponding to the plurality of location data points, each location data point mapping to one of the geohashes of the first set;
determine, for each geohash in the first set, a representative geographic location based on stored geographic coordinates of location data points which map to the geohash;
identify a plurality of location clusters by performing clustering based on string comparison using the geohashes of the first set;
determine normalized cluster locations associated with the plurality of location clusters based on the representative geographic locations associated with the geohashes of the first set;
receive, via the user device, a request to access a first remote resource;
determine that a current location of the user device is within a predefined threshold distance from a first one of the normalized cluster locations; and
in response to determining that the current location of the user device is within the predefined threshold distance from the first normalized cluster location, grant, to the user device, access to the first remote resource.

12. The computing system of claim 11, wherein the geographic coordinates include latitude and longitude coordinates associated with the user device.

13. The computing system of claim 11, wherein determining the representative geographic location for a geohash comprises computing a centroid representing an arithmetic mean of the geographic coordinates of location data points which map to the geohash.

14. The computing system of claim 13, where the processor is further configured to compute at least one of variance or standard deviation for latitude and longitude coordinates of the location data points which map to the geohash.

15. The computing system of claim 11, wherein the processor is further configured to:
determine relative device location for the user device, the relative device location indicating the current location of the user device relative to one or more of the normalized cluster locations; and
select a security policy for the user device based on the relative device location.

16. The computing system of claim 15, wherein selecting the security policy comprises selecting a first security mode in response to determining that the current location of the user device is within a predefined threshold distance from a normalized cluster location associated with at least one of the plurality of location clusters.

17. The computing system of claim 16, wherein the processor is further configured to determine, for each of the plurality of location clusters, a frequency value representing a number of the location data points associated with the location cluster, wherein selecting the security policy comprises selecting a security mode for the user device based on a determination of whether a frequency value of the at least one location cluster exceeds a predefined threshold number.

18. The computing system of claim 15, wherein selecting the security policy comprises selecting a second security mode in response to determining that the current location of the user device is not within a predefined threshold distance from any of the normalized cluster locations.

19. The computing system of claim 11, wherein obtaining the first set of geohashes comprises converting, for each of the plurality of location data points, geographic coordinates associated with the location data point to a geohash.

20. The computing system of claim 11, wherein storing the plurality of location data points in the database comprises storing, for each of the location data points, geographic coordinates of the location data point in association with a geohash of the first set to which the location data point maps.

* * * * *